(12) United States Patent
Speh et al.

(10) Patent No.: US 11,075,042 B2
(45) Date of Patent: Jul. 27, 2021

(54) ELECTROMAGNETIC ACTUATING DEVICE FOR A SWITCHING ELEMENT

(71) Applicant: ZF Friedrichshafen AG, Friedrichshafen (DE)

(72) Inventors: Thomas Speh, Walpertshofen (DE); Martin Ruider, Schwarzhofen (DE); Michael Pantke, Friedrichshafen (DE); Thomas Schwegler, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 153 days.

(21) Appl. No.: 16/495,804

(22) PCT Filed: Feb. 6, 2018

(86) PCT No.: PCT/EP2018/052863
§ 371 (c)(1),
(2) Date: Sep. 19, 2019

(87) PCT Pub. No.: WO2018/171971
PCT Pub. Date: Sep. 27, 2018

(65) Prior Publication Data
US 2020/0027674 A1 Jan. 23, 2020

(30) Foreign Application Priority Data
Mar. 22, 2017 (DE) ..................... 10 2017 204 834.4

(51) Int. Cl.
*F16F 9/16* (2006.01)
*H01H 47/02* (2006.01)
(Continued)

(52) U.S. Cl.
CPC .............. *H01H 47/02* (2013.01); *F16D 27/14* (2013.01); *F16F 9/16* (2013.01); *H01H 47/22* (2013.01); *H01H 50/18* (2013.01); *H01H 50/44* (2013.01)

(58) Field of Classification Search
CPC ............ F16F 9/16; F16D 27/14; H01H 3/605; H01H 47/02; H01H 47/22; H01H 50/18; H01H 50/44
See application file for complete search history.

(56) References Cited

U.S. PATENT DOCUMENTS

| 4,821,847 A | * | 4/1989 | Langdon | ................. F16D 55/36 188/171 |
| 4,958,712 A | * | 9/1990 | Suganuma | .............. F16D 13/52 192/113.36 |

(Continued)

FOREIGN PATENT DOCUMENTS

| DE | 1737087 U | 1/1957 |
| DE | 137036 A1 | 8/1979 |

(Continued)

OTHER PUBLICATIONS

Office Action in German Application No. 102017204834.4, dated Dec. 15, 2017, 14 pages.

(Continued)

*Primary Examiner* — Harry R Behm
(74) *Attorney, Agent, or Firm* — Brinks Gilson & Lione

(57) ABSTRACT

An electromagnetic control mechanism for a switching element is described herein, which can be switched to an open operating state and to a closed operating state by means of an electromagnet and an actuating unit that acts counter to the actuation force of the electromagnet. The electromagnet has a dedicated mechanism for dampening the actuation movement of an anchor of the electromagnet toward a section of the coil, by means of which the actuation speed of the anchor can be reduced after a distance between a section of the anchor facing the coil and the section of the coil becomes shorter than a predefined distance. The mechanism for dampening comprises at least one component connected to the coil, which becomes functionally connected to the anchor after the distance becomes shorter than the defined distance, wherein, as the displacement of the anchor increases, liquid can be discharged from a chamber bordered by the component and the anchor via a throttle mechanism to an extent that reduces the actuation speed of the anchor.

10 Claims, 3 Drawing Sheets

(51) Int. Cl.
*H01H 47/22* (2006.01)
*H01H 50/18* (2006.01)
*H01H 50/44* (2006.01)
*F16D 27/14* (2006.01)

(56) References Cited

U.S. PATENT DOCUMENTS

| | | | | |
|---|---|---|---|---|
| 5,816,376 | A | * 10/1998 | Hatori | F16D 35/024 |
| | | | | 192/58.61 |
| 9,221,336 | B1 | * 12/2015 | Bonny | B60K 17/28 |
| 2007/0271915 | A1 | 11/2007 | Safran et al. | |
| 2013/0214886 | A1 | 8/2013 | Ohtsuka et al. | |
| 2014/0225691 | A1 | 8/2014 | Tanaka et al. | |

FOREIGN PATENT DOCUMENTS

| | | |
|---|---|---|
| DE | 3924814 A1 | 3/1990 |
| DE | 102004049963 A1 | 11/2005 |
| DE | 102012010790 A1 | 12/2013 |
| DE | 102013201308 A1 | 7/2014 |
| EP | 0795881 A1 | 9/1997 |
| EP | 1612400 A1 | 1/2006 |
| EP | 2869097 A1 | 5/2015 |
| GB | 2026110 A | 1/1980 |
| WO | WO 03023245 A1 | 3/2003 |
| WO | WO 2013182366 A1 | 12/2013 |

OTHER PUBLICATIONS

International Search Report and Written Opinion, with English translation, of International Application No. PCT/EP2018/052863, dated Jul. 6, 2018, 16 pages.

\* cited by examiner

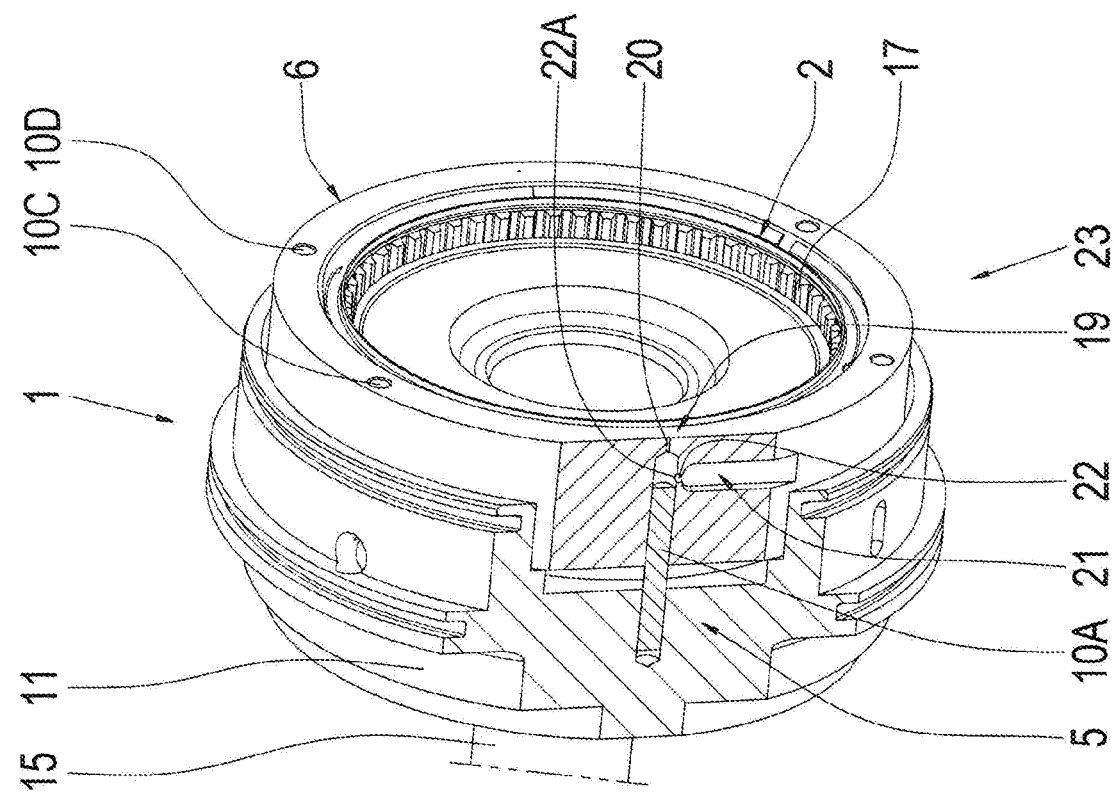
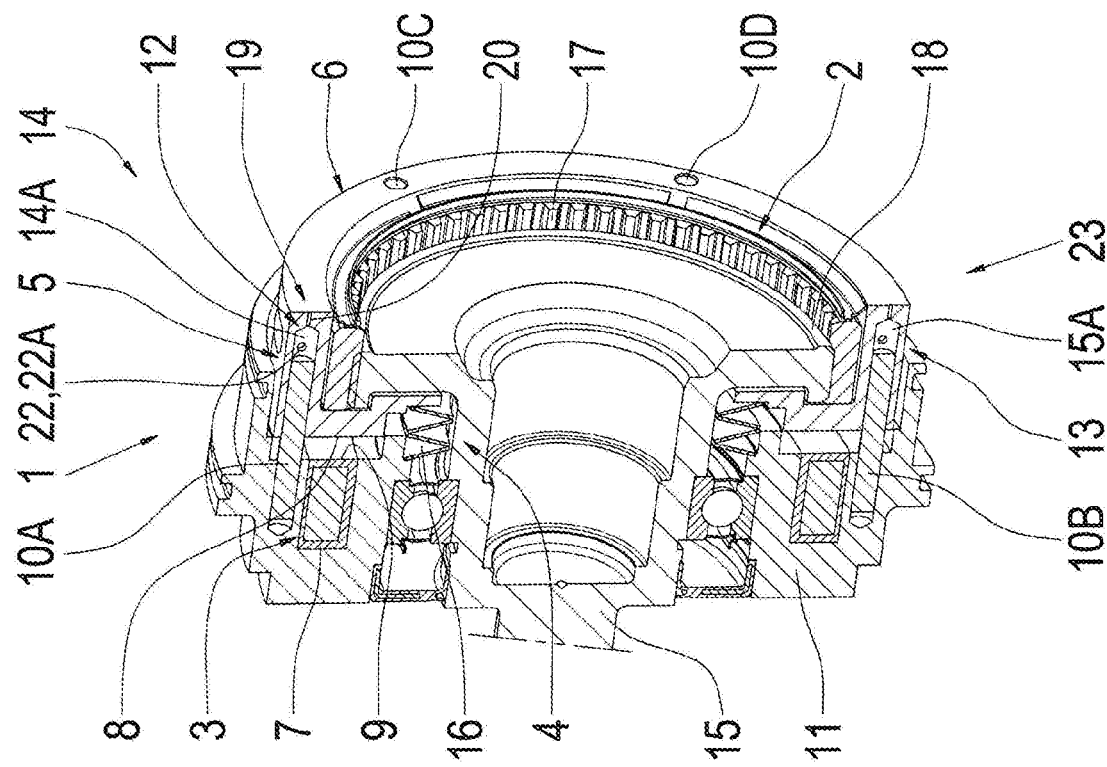

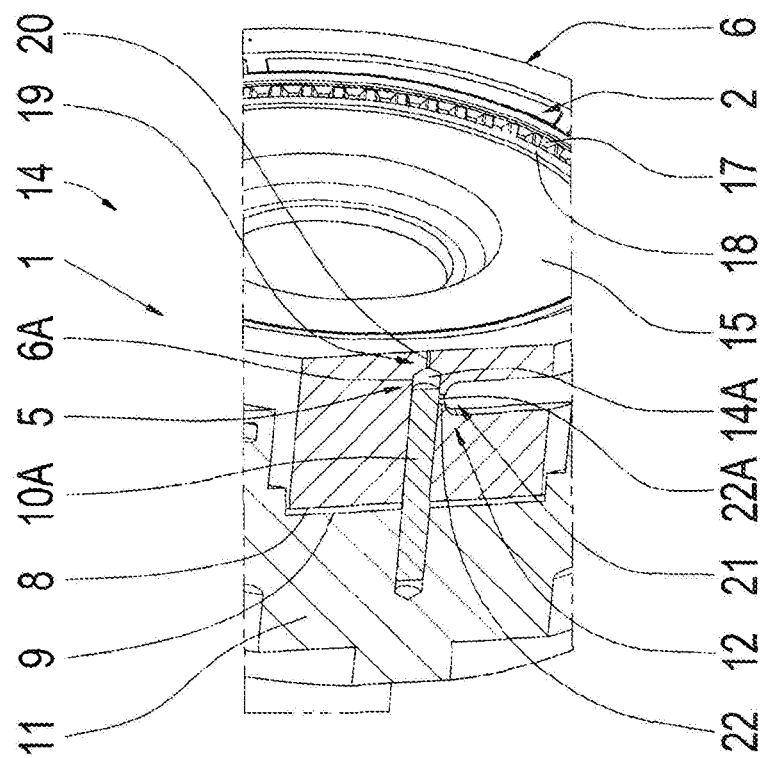
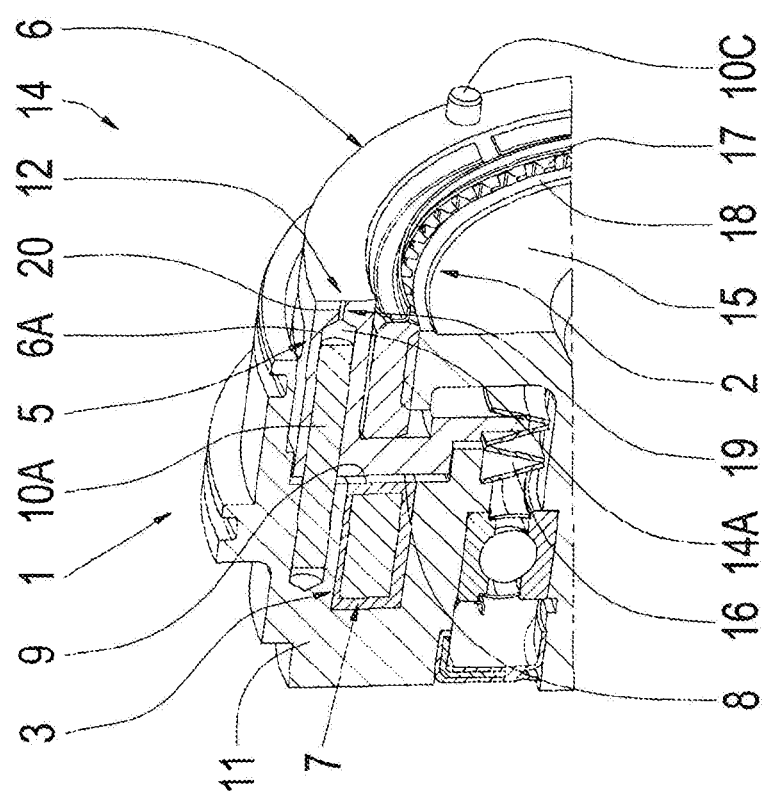

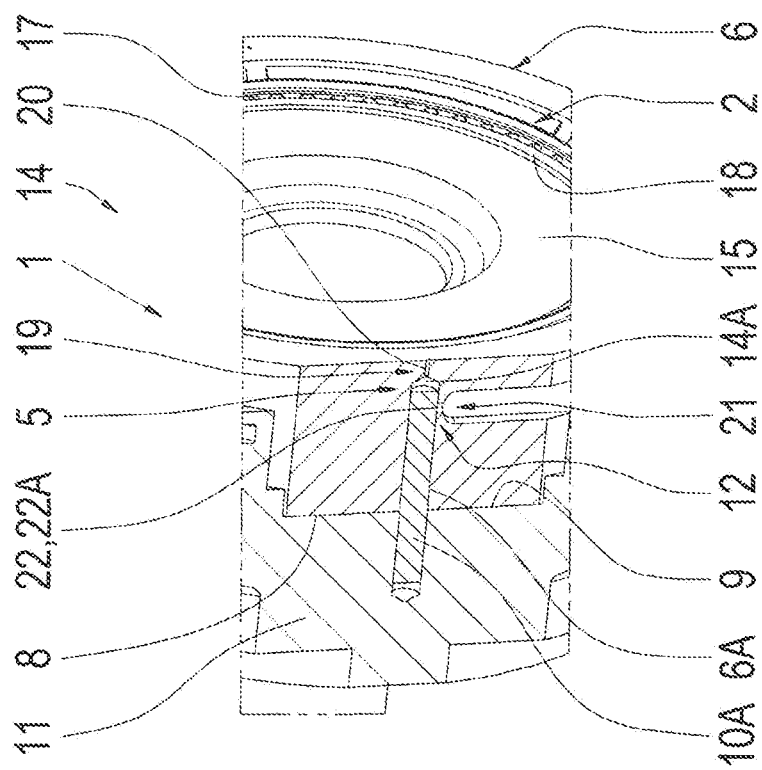
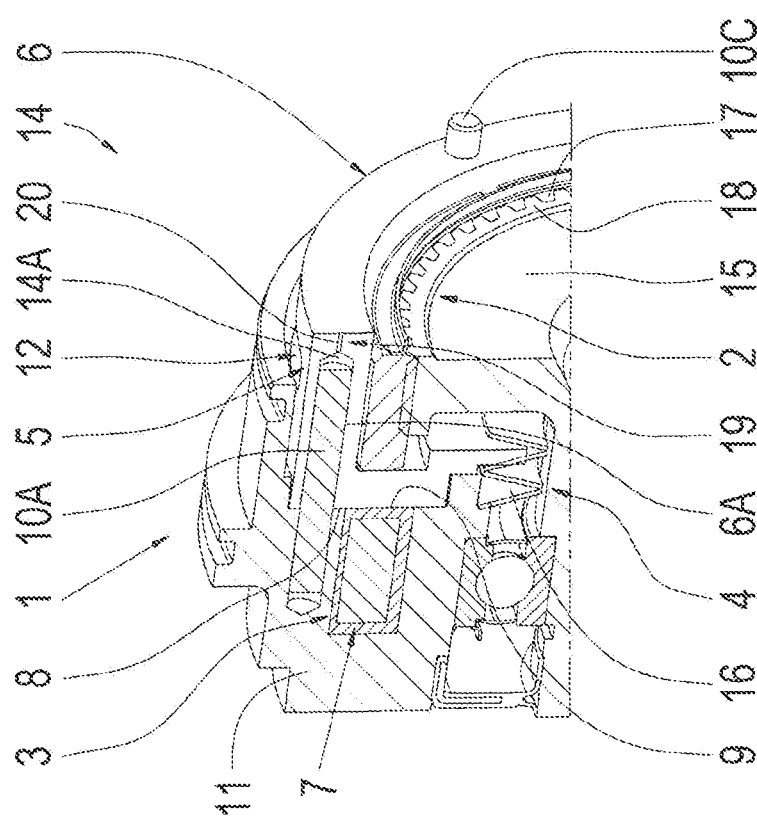

ELECTROMAGNETIC ACTUATING DEVICE FOR A SWITCHING ELEMENT

RELATED APPLICATIONS

This application is a filing under 35 U.S.C. § 371 of International Patent Application PCT/EP2018/052863, filed Feb. 6, 2018, claiming priority to German Patent Application 10 2017 204 834.4, filed Mar. 22, 2017. All applications listed in this paragraph are hereby incorporated by reference in their entireties.

TECHNICAL FIELD

The invention relates to an electromagnetic control mechanism for a switching element according to the preamble of claim 1.

BACKGROUND

Monostable electromagnetic control mechanisms known in the field execute a specific functional movement in each predefined actuation direction. The direction of the electric current that activates such electromagnetic actuators is insignificant. A spring element is frequently used to reset the electromagnetic actuator. If a voltage is applied to an electromagnetic actuator, current flows through it, and a magnetic field is generated. This current-induced magnetic field draws an anchor toward it in the known manner, reducing a gap between the anchor and the coil, and the magnetic force acting on the anchor increases exponentially. When the anchor reaches an end stop, the gap is eliminated, and the magnetic force acting on the anchor, as well as its actuation speed when the anchor strikes a housing of a coil in the electromagnetic actuator, are at their highest. In order to reduce the noise when the anchor strikes the housing of the coil, as well as the structural load, the actuation speed of the anchor must be reduced before reaching the end stop. Dampers are used for this.

A connector for two shafts that has an impact damper is known from DE 10 2012 210 298 A1. The impact damper comprises at least one spring element and one damper element for dampening the sound. The at least one spring element gently absorbs the impact energy, while the at least one damper element converts at least a portion of the impact energy into thermal energy. Suitable damper elements are made of elastomers or foam or foamed materials such as plastic or metal foams. Moreover, damper elements made of fibrous elements, e.g. fiberglass or carbon composite plates that have a synthetic resin matrix or the like, or damper elements comprising cushions filled with a liquid, e.g. cushions filled with air, oil or gel, are also proposed. In addition, suitable spring elements absorb mechanical impacts, and cushion them, in particular through an elastic buildup of potential energy. These spring elements are composed of one or more helical springs, plate springs, wave springs, etc. This also results in a narrower installation space, when the spring element and the damper element are arranged in rows.

The damper and spring elements of the impact damper described above unfortunately age, due to the mechanical loads and environmental effects they are subjected to when in operation, e.g. the effects of temperature and oil, which compromise the dampening properties of an impact damper over the course of its service life.

SUMMARY

The fundamental object of the present invention is to create an electromagnetic control mechanism for a switching element that is distinguished by a long service life and low noise.

With the electromagnetic control mechanism for a switching element, which can be switched between an open operating state and a closed operating state by means of an electromagnet and an actuating unit acting counter to the actuation force of the electromagnet, the electromagnet has a dedicated mechanism for dampening the actuation movement of an electromagnet anchor toward the coil, by means of which the actuation speed of the anchor can be reduced once the distance between a section of the anchor facing the coil and the coil falls below a predefined value.

According to the invention, the mechanism for dampening at least one component connected to the coil, which is functionally connected to the anchor, at least in part, when the distance between them is shorter than the defined distance, wherein, as the displacement of the anchor increases, enough liquid to reduce the actuation speed of the anchor can be discharged from a chamber bordered by the component and the anchor via a throttle mechanism.

By discharging the liquid from the chamber bordering on the component and the anchor via the throttle mechanism, the actuation movement of the anchor near where it strikes the coil can be dampened, substantially without wear, by means of which noises resulting when the anchor strikes the coil can be minimized in a simple manner, and the mechanism used for dampening the actuation speed of the anchor can be operated with practically no wear thereto. As a result, the mechanism for dampening the actuation movement of the electromagnet anchor remains functional over the entire service life of the electromagnetic control mechanism.

With a structurally simple embodiment of the electromagnetic control mechanism that can be produced inexpensively, the component is in the form of a pin-shaped element, or the anchor has a pin-shaped element, which engages in a blind hole in the anchor or the component when the distance between the two is shorter than the defined distance, thus delimiting the chamber.

If the element is in the form of an arc, or the anchor has at least one arced element, which engages in an arced recess in the anchor or the component when the two are closer than the defined distance between them, and delimits the chamber, it is possible to effectively cushion the impact without generating undesired tilting effects in the region of the anchor.

If the throttle mechanism comprises a throttle section that connects the chamber with a low-pressure area, via which the liquid can be discharged from the chamber during the actuation movement of the anchor after the distance between the anchor and the component becomes shorter than the defined distance, the dampening effect can be adjusted in a simple manner by configuring the throttle section to the respective present application.

If the component or the anchor engages in the anchor or the component before the distance between the two is shorter than the defined distance, and the throttle mechanism has another throttle section that connects the chamber to the low-pressure area, the throttle cross section of which is greater than the throttle cross section of the throttle section, and via which the liquid can be discharged from the chamber until the distance becomes shorter than the defined distance, the liquid medium forced out of the chamber as the anchor is drawn inward is first primarily discharged from the chamber via the other throttle section, and the actuation movement of the anchor is only dampened to a slight extent. As soon as liquid is no longer discharged from the chamber via the other throttle section, liquid is only discharged via the throttle section of the throttle mechanism, dampening the actuation movement of the anchor to a greater extent. As a result, the anchor is moved substantially without dampening during almost all of the actuation of the switching element, and the actuation movement of the anchor is first dampened shortly before the anchor strikes the coil such that noise and structural loads are dampened.

In a structurally simple embodiment of the electromagnetic control device according to the invention that can be produced inexpensively, the throttle section has a throttle hole. If the throttle hole passes through the first component or the second component, the throttle mechanism can be produced easily.

The other throttle section is in the form of a throttle hole in a likewise structurally simple and inexpensive embodiment of the electromagnetic control mechanism according to the invention.

If the other throttle section is in the form of a throttle gap, which is delimited by an outer section of the component or the anchor and an inner section of the anchor or component that interacts with the outer section, the electromagnetic control mechanism according to invention can also be produced in a simple manner.

In a further development of the electromagnetic control mechanism that can be operated with less control and regulating effort, the actuating unit comprises a reset spring, the spring force of which at the anchor acts against the actuation force of the electromagnet.

Both the features specified in the claims as well as the features specified in reference to the following exemplary embodiment of the electromagnetic control mechanism according to the invention can be used to further development the subject matter of the invention, in and of themselves or in arbitrary combinations thereof.

BRIEF DESCRIPTION OF THE DRAWINGS

Further advantages and advantageous embodiments of the electromagnetic control mechanism according to the invention can be derived from the claims and the following description of the exemplary embodiment in reference to the drawings.

Therein:

FIG. 1a shows a schematic, three-dimensional sectional view of an electromagnetic control mechanism for a switching element, when it is not subjected to a current;

FIG. 1b shows a three-dimensional sectional view of the electromagnetic control mechanism according to FIG. 1;

FIG. 2a shows an enlarged sectional view of the electromagnetic control mechanism according to FIG. 1, with the anchor in an intermediate position;

FIG. 2b shows the electromagnetic control mechanism in an operating state corresponding to that shown in FIG. 2a, in a three-dimensional sectional view;

FIG. 3a shows the electromagnetic control mechanism according to FIG. 1 in an illustration corresponding to FIG. 2a, wherein the anchor bears on a coil of the control mechanism; and FIG. 3b shows an illustration of the electromagnetic control mechanism corresponding to FIG. 2b, in an operating state corresponding to FIG. 3a.

DETAILED DESCRIPTION

A three-dimensional sectional view of an electromagnetic control mechanism 1 for a switching element 2 is shown in FIG. 1. The switching element 2 can be switched to an open operating state and the closed operating state shown in FIG. 1a by means of an electromagnet 3 and an actuating unit 4 that acts against the actuation force of the electromagnet 3.

The electromagnet 3 has a dedicated mechanism 5 for dampening the actuation movement of an anchor 6 of the electromagnet 3 toward a coil 7 of the electromagnetic control mechanism 1. The actuation speed of the anchor 6 can be reduced to a defined extent by means of the mechanism 5 after the distance between a section of the anchor facing the coil 7 and the section 9 of the coil 7 facing the anchor 6 becomes shorter than a predefined distance.

The anchor 6 is securely supported radially on another component 11 securely connected to the coil 7 via components 10A to 10D distributed over the circumference of the control mechanism 1, in the present case in the form of pin elements. The lengths of the pin elements 10A to 10D are greater than the axial length of the anchor 6, thus resulting in a maximum axial guide length for the anchor 6. The axial length of two opposing pin elements 10A and 10B is shorter than the axial length of the other pin elements 10C, 10D, such that, in addition to supporting the anchor 6 on the coil 7 in the manner described in greater detail below, they can dampen the actuation movement of the anchor 6 when it is close to striking the coil 7.

The pin elements 10A and 10B are presently located in blind holes 6A, 6B of the anchor 6, each of which are functionally connected via a throttle mechanism 12, 13 to the exterior 14 of the control mechanism 1 that represents a low-pressure area. The pin elements 10A and 10B and the anchor border on a chamber 14A, 15A, which are connected to the exterior 14 of the control mechanism 1 via the throttle mechanism 12, 13.

In the operating state of the switching element 2 shown in FIG. 1a, the anchor 6 is pushed by a reset spring 16 of the actuating unit 4 into its second end position, in which a section 8 of the anchor 6 facing the coil 7 is at a maximum distance to a section 9 of the coil 7 facing the anchor 6. In this switching setting of the anchor 6, an inner toothing 17 of the anchor meshes with an outer toothing 18 of a shaft 15 located radially inside the electromagnetic control mechanism. In addition, the inner toothing 17 of the anchor 6 engages with a toothing of another shaft, not shown in FIG. 1a, when the anchor 6 is in the switching setting shown in FIG. 1a, by means of which the shaft 15 is connected to the other shaft for conjoint rotation therewith via the inner toothing 17 of the anchor 6.

The throttle mechanisms 12 and 13 have substantially the same construction, for which reason reference shall only be substantially made to the throttle mechanism 12 in the following description, and reference is made to the functioning of the throttle mechanism 12, explained in greater detail, with regard to the other functions of the throttle mechanism 13.

The throttle mechanism 12 in the present case comprises a throttle section 19 that connects the chamber 14A to the exterior 14, which has a throttle hole 20 at the end of the blind hole 6A, which connects the end region of the blind hole 6A to the exterior 14 through the anchor 6, independently of the axial position of the anchor 6. The throttle mechanism 12 also comprises another throttle section 21 that connects the chamber 14A to the exterior 14, shown in greater detail in FIG. 1b, which likewise has a throttle hole 22, the throttle cross section of which is greater than the throttle cross section of the throttle hole 20.

In the switching setting of the anchor 6 shown in FIG. 1a and FIG. 1b, the chamber 14A is connected to the exterior 14 via the throttle section 19 as well as the throttle section 21. If there is a demand to release the conjoint rotation connection between the shaft 15 and the other shaft, current is supplied to the coil 7 in the manner known per se, and the anchor 6 is moved axially from the switching setting shown in FIG. 1a by the magnetic field generated by the electromagnet 3 toward the coil 7, counter to the spring force of the reset spring 16. During this actuation movement of the anchor 6, the pin elements 10A and 10B are inserted further into the chambers 14A and 15A. Hydraulic fluid located in the chambers 14A and 15A is then discharged via the throttle mechanisms 12 and 13 toward the exterior 14 of the control mechanism 1.

There is hydraulic fluid in the chambers 14A and 15A because the electromagnetic control mechanism 1 presently located in the interior of a vehicle transmission rotates with the shaft 15 when the vehicle transmission is operated, and enters a hydraulic fluid, or oil pan, at a lower region 23 when it is installed in the vehicle transmission, such that the chambers 14A and 15A are filled with hydraulic fluid when the anchor 6 is in the second end position.

As the displacement of the anchor 6 increases, and the pin element 10A is inserted further into the chamber 14A, the hydraulic fluid in the chamber 14A is discharged into the exterior 14 via both throttle sections 19 and 21, as long as an opening 22A of the throttle hole 22 of the throttle mechanism 12 shown in FIG. 1b is unobstructed by the pin element 10A. Starting at a defined displacement of the anchor 6, where there is a defined distance between the section 8 of the anchor 6 and the section 9 of the coil 7, the opening 22A of the throttle hole 22 of the throttle section 21 is blocked by the pin element 10A to the extent shown in FIG. 2a and FIG. 2b, such that the hydraulic fluid in the chamber 14A can only be discharged to the exterior via the throttle section 19 as the displacement of the anchor 6 toward the coil 7 increases.

Because of the size of the throttle cross section of the throttle holes 20 and 22, the actuation movement of the anchor 6 is only dampened to a slight extent as long as the throttle hole 22 is not blocked by the pin element 10A. Starting at the displacement of the anchor 6 at which the pin element 10A passes over the throttle hole 22, the actuation movement of the anchor 6 toward the coil is dampened to a substantially greater extent, due to the fact that there is now only a substantially smaller cross section in the region of the throttle hole for discharging the hydraulic fluid in the chamber 14A, thus dampening the impact of the anchor 6 on the coil 7 to the desired extent. The axial position of the opening 22A of the throttle hole 22 is such that the high level of dampening of the actuation movement of the anchor 6 is first obtained shortly before the anchor 6 strikes the section 9 of the coil 7.

FIG. 3a and FIG. 3b show the electromagnetic control mechanism 1 according to FIG. 1 in an operating state in which the shaft 5 is fully disengaged from the other shaft, and the anchor 6 bears on the coil 7 without a gap. The other pin elements 10C and 10D are located on the other component 11 in through holes in order to guide the anchor 6 axially, for which reason an actuation movement of the anchor 6 between the two end positions is only dampened to a slight extent in these regions. The dampening effects of the mechanism 5 for dampening the actuation movement of the anchor 6 can be easily varied with little effort by dimensioning the diameter of the throttle hole 20 accordingly.

In the exemplary embodiment of the electromagnetic control mechanism 1 shown in the drawings, the anchor 6 with the throttle hole 20 is displaced. It is also possible to form the blind holes 6A and 6B in the component 11, and to securely connect the pin elements 10A and 10B to the anchor 6, such that they can be displaced along with the anchor 6.

It is also possible for the throttle hole 20 to pass axially through the pin elements 10A and 10B, and to connect the chambers 14A and 15A to the exterior 14 through the pin elements 10A and 10B.

Independently of the extent to which the pin elements 10A and 10B are used for guiding the anchor 6 axially on the component 11, the functional principle described above for dampening the impact of the anchor 6 can be implemented in a simple manner.

REFERENCE SYMBOLS 1 electromagnetic control mechanism
2 switching element
3 electromagnet
4 actuating unit
5 mechanism
6 anchor
6A, 6B blind hole
7 coil
8 section of the anchor
9 section of the coil
10A to 10B component, pin element
11 component
12, 13 throttle mechanism
14 exterior
14A chamber
15 shaft
15A chamber
16 reset spring
17 inner toothing
18 outer toothing
19 throttle section
20 throttle hole
21 throttle section
22 throttle section
22A opening of the throttle hole
23 lower region

The invention claimed is:
1. An electromagnetic control mechanism comprising:
a switching element;
an electromagnet further comprising a coil; and
an actuating unit that acts counter to an actuation force of the electromagnet,
wherein the electromagnet and the actuating unit switch the switching element between an open operating state and a closed operating state; and
a dampener configured to dampen an actuation movement of an anchor of the electromagnet toward a section of the coil by reducing an actuation speed of the anchor after a distance between a section of the anchor facing the coil and the section of the coil becomes shorter than a predefined distance, wherein the dampener comprises:
at least one component connected to the coil and functionally connected to the anchor, at least in part, after the distance between the section of the anchor facing the coil and the section of the coil becomes shorter than the predefined distance;
a chamber bordered by the component and the anchor configured to hold a liquid; and
a throttle mechanism, wherein the dampener is configured to discharge the liquid from the chamber via the throttle mechanism to reduce the actuation speed of the anchor.

2. The electromagnetic control mechanism according to claim 1, wherein the component comprises a pin-like element which engages in a blind hole of the anchor and delimits the chamber when the distance between the section of the anchor facing the coil and the section of the coil becomes shorter than the predefined distance.

3. The electromagnetic control mechanism according to claim 1, wherein the component comprises an arched element, which engages in an arched recess in the anchor and delimits the chamber when the distance between the section of the anchor facing the coil and the section of the coil becomes shorter than the predefined distance.

4. The electromagnetic control mechanism according to claim 1, wherein the throttle mechanism comprises a first throttle section that connects the chamber to a low-pressure region, via which the liquid can be discharged from the chamber during the actuation movement of the anchor after the distance becomes shorter than the predefined distance.

5. The electromagnetic control mechanism according to claim 4, wherein the component engages with the anchor before the distance becomes shorter than the predefined distance, and wherein the throttle mechanism comprises a second throttle section that connects the chamber to the low-pressure region, the second throttle section having a throttle cross section that is greater than a throttle cross section of the first throttle section, and wherein liquid can be discharged from the chamber until the distance between the section of the anchor facing the coil and the section of the coil becomes shorter than the predefined distance.

6. The electromagnetic control mechanism according to claim 5, wherein the second throttle section has a throttle hole.

7. The electromagnetic control mechanism according to claim 5, wherein the second throttle section comprises a throttle gap, delimited by an outer region of the component and an inner region of the anchor that interacts with the outer region of the component.

8. The electromagnetic control mechanism according to claim 4, wherein the first throttle section has a throttle hole.

9. The electromagnetic control mechanism according to claim 8, wherein the throttle hole passes through the component or the anchor.

10. The electromagnetic control mechanism according to claim 1, wherein the actuating unit comprises a reset spring, the spring force of which counteracts the actuation force of the electromagnet.

* * * * *